US012613051B2

(12) United States Patent
Merchant, III et al.

(10) Patent No.: US 12,613,051 B2
(45) Date of Patent: Apr. 28, 2026

(54) THERMOSTATS, METHODS, AND SYSTEMS FOR CONTROLLING HVAC SYSTEMS

(71) Applicant: Copeland Comfort Control LP, St. Louis, MO (US)

(72) Inventors: Daniel E. Merchant, III, Boulder, CO (US); Thomas B. Lorenz, St. Louis, MO (US)

(73) Assignee: Copeland Comfort Control LP, St. Louis, MO (US)

( * ) Notice: Subject to any disclaimer, the term of this patent is extended or adjusted under 35 U.S.C. 154(b) by 414 days.

(21) Appl. No.: 18/302,271

(22) Filed: Apr. 18, 2023

(65) Prior Publication Data

US 2024/0353137 A1     Oct. 24, 2024

(51) Int. Cl.
| | |
|---|---|
| *F24F 11/64* | (2018.01) |
| *F24F 11/52* | (2018.01) |
| *F24F 11/72* | (2018.01) |
| *G05B 19/042* | (2006.01) |
| *F24F 110/12* | (2018.01) |
| *F24F 110/22* | (2018.01) |
| *F24F 110/50* | (2018.01) |

(52) U.S. Cl.
CPC ............. *F24F 11/64* (2018.01); *F24F 11/52* (2018.01); *F24F 11/72* (2018.01); *G05B 19/042* (2013.01); *F24F 2110/12* (2018.01); *F24F 2110/22* (2018.01); *F24F 2110/50* (2018.01); *G05B 2219/2614* (2013.01)

(58) Field of Classification Search
CPC .. F24F 11/64; F24F 11/52; F24F 11/72; F24F 2110/12; F24F 2110/22; F24F 2110/50; F24F 11/30; F24F 11/58; F24F 2110/10; F24F 2130/10; F24F 11/46; F24F 11/006; F24F 11/0001; G05B 19/042; G05B 2219/2614

See application file for complete search history.

(56) References Cited

U.S. PATENT DOCUMENTS

| | | | | |
|---|---|---|---|---|
| 5,850,742 A | * | 12/1998 | Bang | ........................ F24F 11/30 62/263 |
| 9,618,224 B2 | | 4/2017 | Emmons et al. | |
| 10,458,668 B2 | | 10/2019 | Emmons et al. | |
| 11,326,800 B2 | | 5/2022 | Schindler et al. | |

(Continued)

FOREIGN PATENT DOCUMENTS

| | | | | |
|---|---|---|---|---|
| JP | | 2014031950 A | * | 2/2014 |

*Primary Examiner* — Alicia M. Choi
(74) *Attorney, Agent, or Firm* — Armstrong Teasdale LLP

(57) ABSTRACT

A method of conditioning air includes controlling, by a thermostat, an HVAC system to condition the air within an enclosed space according to one or more temperature setpoints stored in a memory of the thermostat and the temperature within the enclosed space. Weather data for outside the enclosed space is received and compared to a previously received preference. The HVAC system is controlled to condition the air according to the one or more temperature setpoints and the temperature within the enclosed space when the weather data does not satisfy the preference. When the weather data satisfies the preference, the user is notified that heating or cooling by the HVAC system will be turned off and that the user should open the at least one opening to outside of the enclosed space, and the thermostat controls the HVAC system to stop conditioning the air.

20 Claims, 3 Drawing Sheets

(56) References Cited

U.S. PATENT DOCUMENTS

| | | | |
|---|---|---|---|
| 2005/0194125 A1* | 9/2005 | Asai | B60H 1/00792 |
| | | | 165/202 |
| 2013/0083193 A1* | 4/2013 | Okuyama | G08C 17/02 |
| | | | 348/143 |
| 2015/0325096 A1* | 11/2015 | Hatch | E05F 15/71 |
| | | | 340/601 |
| 2018/0216841 A1* | 8/2018 | Steinberg | G05B 15/02 |
| 2019/0195523 A1* | 6/2019 | Mowris | F24F 11/61 |
| 2022/0113034 A1* | 4/2022 | Moore | F24F 11/64 |
| 2023/0006858 A1 | 1/2023 | Crites et al. | |
| 2023/0313609 A1* | 10/2023 | Boyd | E06B 9/68 |
| | | | 160/7 |

* cited by examiner

400

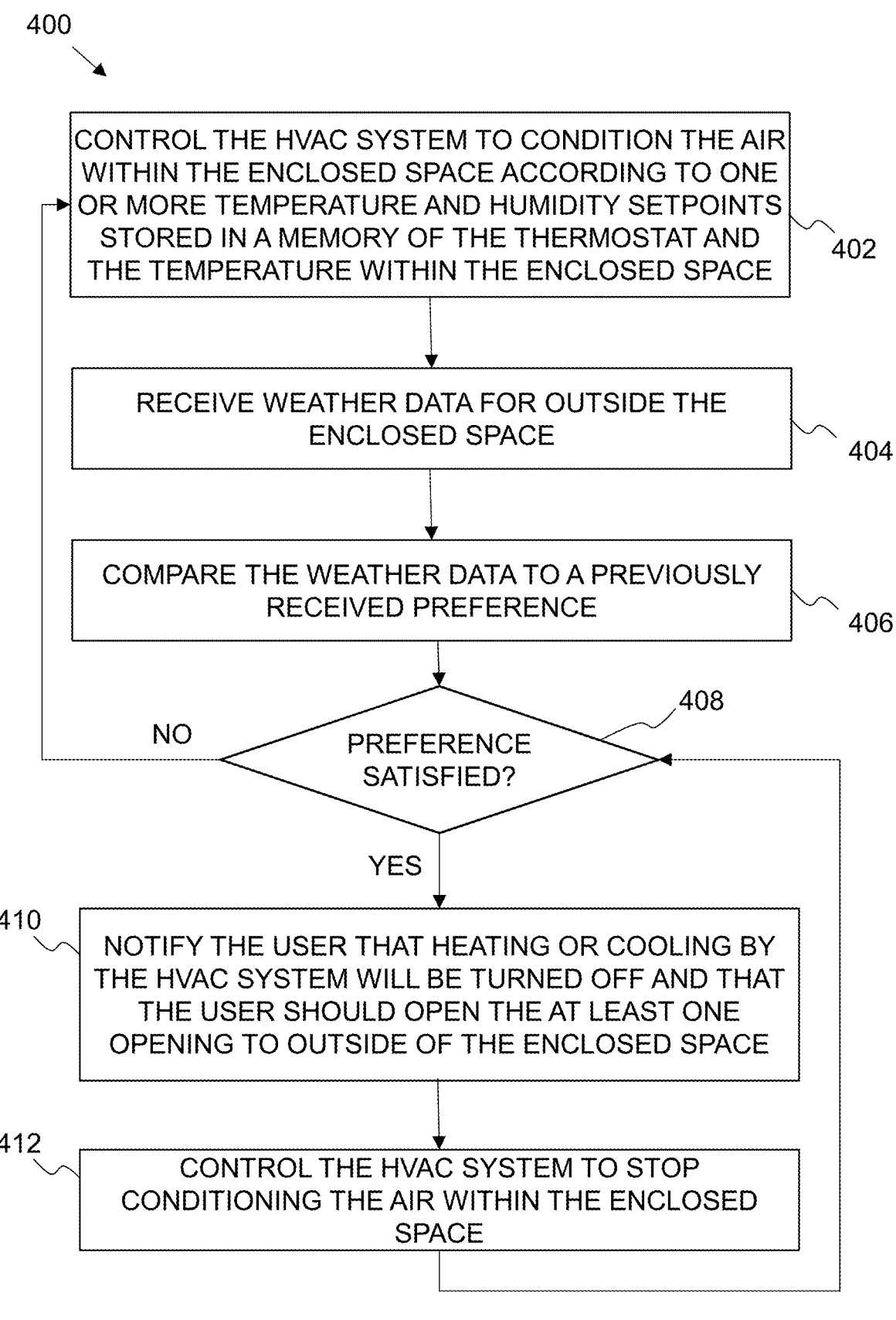

CONTROL THE HVAC SYSTEM TO CONDITION THE AIR WITHIN THE ENCLOSED SPACE ACCORDING TO ONE OR MORE TEMPERATURE AND HUMIDITY SETPOINTS STORED IN A MEMORY OF THE THERMOSTAT AND THE TEMPERATURE WITHIN THE ENCLOSED SPACE

402

RECEIVE WEATHER DATA FOR OUTSIDE THE ENCLOSED SPACE

404

COMPARE THE WEATHER DATA TO A PREVIOUSLY RECEIVED PREFERENCE

406

408

NO

PREFERENCE SATISFIED?

YES

410

NOTIFY THE USER THAT HEATING OR COOLING BY THE HVAC SYSTEM WILL BE TURNED OFF AND THAT THE USER SHOULD OPEN THE AT LEAST ONE OPENING TO OUTSIDE OF THE ENCLOSED SPACE

412

CONTROL THE HVAC SYSTEM TO STOP CONDITIONING THE AIR WITHIN THE ENCLOSED SPACE

FIG. 4

THERMOSTATS, METHODS, AND SYSTEMS FOR CONTROLLING HVAC SYSTEMS

BACKGROUND

The field of the invention relates generally to thermostats and operation of heating ventilation and air conditioning (HVAC) systems, and more particularly, to systems and methods for stopping operation of at least part of the HVAC system and allowing fresh outdoor air to enter a conditioned space based at least in part on a user preference.

Conventional thermostats generally control operation of an HVAC system based on a temperature setpoint or schedule of temperature setpoints and a measurement of the air temperature in the space being conditioned by the HVAC system. Such thermostats typically do not consider the weather outside of the conditioned space or the air quality (other than temperature) within the conditioned space. Thus, conventional thermostats generally do not assist a user with brining fresh air into the conditioned space and limiting the use of the HVAC system when the weather outside of the conditioned space is pleasant.

This background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

One aspect of this disclosure is a method of conditioning air within an enclosed space occupiable by a user and having at least one opening to outside of the enclosed space that may be selectively opened or closed. A thermostat monitors a temperature of the air within the enclosed space and controls a heating ventilation and air condition (HVAC) system in fluid communication with the enclosed space. The method includes controlling, by the thermostat, the HVAC system to condition the air within the enclosed space according to one or more temperature setpoints stored in a memory of the thermostat and the temperature within the enclosed space. Weather data for outside the enclosed space is received and compared to a previously received preference. The HVAC system is controlled to condition the air within the enclosed space according to the one or more temperature setpoints and the temperature within the enclosed space when the weather data does not satisfy the preference. When the weather data satisfies the preference, the user is notified that heating or cooling by the HVAC system will be turned off and that the user should open the at least one opening to outside of the enclosed space, and the thermostat controls the HVAC system to stop conditioning the air within the enclosed space.

Another aspect of this disclosure is a thermostat for controlling a heating ventilation and air condition (HVAC) system for conditioning air within an enclosed space, the enclosed space occupiable by a user and having at least one opening to outside of the enclosed space that may be selectively opened or closed. The thermostat includes a temperature sensor, a communication interface, processor, and a memory. The memory stores one or more temperature setpoints, a preference, and instructions that program the processor to control the HVAC system to condition the air within the enclosed space according to the one or more temperature setpoints and a temperature within the enclosed space measured by the temperature sensor, receive weather data for outside the enclosed space, compare the weather data to the preference, continue to control the HVAC system to condition the air within the enclosed space according to the one or more temperature setpoints and the temperature within the enclosed space when the weather data does not satisfy the preference. When the weather data the satisfies preference, the instructions that program the processor to notify the user that heating or cooling by the HVAC system will be turned and that the user should open the at least one opening to outside of the enclosed space, and control the HVAC system to stop conditioning the air within the enclosed space.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

FIG. 4 is a flow diagram of an example method for controlling the HVAC system shown in FIG. 1 using the thermostat system shown in FIG. 3.

Like reference symbols in the various drawings indicate like elements.

DETAILED DESCRIPTION

Figures 1, 2:
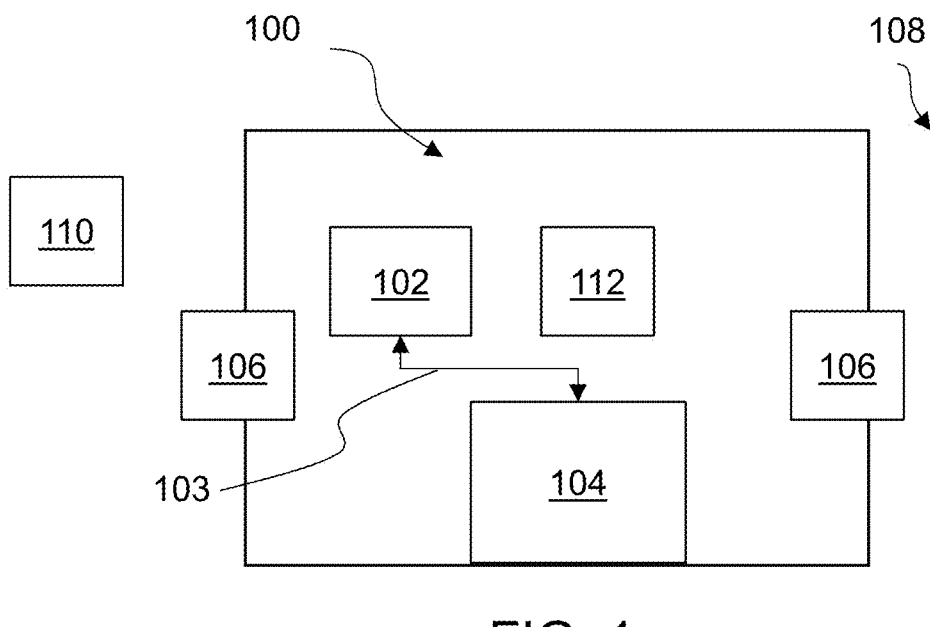
FIG. 1 is a block diagram of an example enclosed space including a thermostat and HVAC system.
FIG. 2 is a diagram of an example thermostat.

FIG. 1 is a block diagram of an example enclosed space 100 including a thermostat 102 and HVAC system 104. Thermostat 102 is communicatively coupled to HVAC system 104 by communication connection 103. Communication connection 103 may be a wired or a wireless connection. Openings 106 to outside 108 of the enclosed space may be selectively opened or closed to permit or prohibit fluid communication between air in the enclosed space 100 and air outside 108 the enclosed space. Outside sensor 110 is located outside 108 of the enclosed space 100 to detect at least one weather condition outside of the enclosed space 100. Inside sensor 112 is positioned within the enclosed space 100 to detect at least one environmental condition within the enclosed space 100.

The enclosed space 100 may be a residential or commercial building, one or more rooms within a building (e.g., an individual apartment, condominium, or office), or the like. Air in the enclosed space is conditioned by the HVAC system 104.

The HVAC system 104 may include any system for heating, cooling, humidifying, and, or dehumidifying (collectively generally referred to herein as "conditioning") the enclosed space 100.

The openings 106 may be any type of opening between the inside of the enclosed space 100 and the outside 108 that may be selectively opened and closed to control communication of air between the enclosed space 100 and the outside

108. For example, the openings 106 may be windows, doors, sliding doors, vent hatches, or the like.

The outside sensor 110 may be a temperature sensor, a humidity sensor, a barometric pressure sensor, a rain sensor, a wind sensor, or any other sensor operable to sense a weather condition outside of the enclosed space. Outside sensor 110 is communicatively coupled by any suitable wired or wireless connection to thermostat 102. Although only one outside sensor 110 is shown, multiple sensors may be included in some embodiments. Some embodiments do not include the outside sensor 110.

The inside sensor 112 may be a humidity sensor or any other type of sensor for sensing an environmental condition within the enclosed space 100. The inside sensor 112 may sometimes be referred to as an indoor air quality sensor. In various embodiments, the inside sensor may sense one or more of particulate matter (e.g., PM2.5), volatile organic compounds (VOCs), temperature, relative humidity, carbon dioxide, air pressure, radon, or the like. Although only one inside sensor 112 is shown, multiple sensors may be included in some embodiments. Some embodiments do not include the inside sensor 112.

FIG. 2 is a block diagram of an example thermostat 102. The thermostat 102 may include and/or be embodied in a computing device. The thermostat 102 includes a display device 204, a user input 206, a processor 208, a memory 210, a communication interface 212, and a temperature sensor 214. When used in connection with the HVAC system 104, the thermostat is communicatively coupled by a wired or wireless connection The user input 206 is operable to receive input from a user. In the example embodiment, the user input 206 includes several buttons. Alternatively, the user input 206 may include one or more dials, one or more switches, a keyboard, or the like.

The display device 204 is configured to display information to a user of the thermostat 102. The display device 204 may be an LCD display, an LED display, a CRT display, a plurality of lights (such as LEDs), or the like. Some embodiments include a touchscreen display that functions as the user input 206 and the display device 204. The user input 206 and the display device 204 may be used together to input data, change settings, retrieve data or settings, and the like to/from the thermostat 102.

The processor 208 is configured for executing instructions to cause the thermostat to perform as described herein. The processor 208 may include one or more processing units (e.g., in a multi-core configuration). In some embodiments, executable instructions are stored in the memory 210. The instructions program the processor to perform as described herein. The term processor, as used herein, refers to central processing units, microprocessors, microcontrollers, reduced instruction set circuits (RISC), application specific integrated circuits (ASIC), logic circuits, and any other circuit or processor capable of executing the functions described herein. The above are examples only, and are thus not intended to limit in any way the definition and/or meaning of the term "processor."

The memory 210 stores computer-readable instructions for control of the thermostat 102 as described herein. The memory also stores operating data such as one or more setpoints, setpoint schedules, and the like for determining when to operate the HVAC system 104. The memory 143 is any device allowing information such as executable instructions and/or other data to be stored and retrieved. The memory 143 may include one or more computer-readable media. The memory may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of data, instructions, and/or a computer program.

Communication interface 212 allows the thermostat 102 to communicate with one or more remote devices (not shown in FIG. 2) other than the HVAC system 104. Although one communication interface 212 is shown, the thermostat may include more than one communication interface, which may utilize the same or different communication protocols. Example remote devices include remote sensors (such as outdoor sensor 110 and indoor sensor 112), remote computing devices (such as a remote server or a user mobile device), and the like. The communication interfaces may be wired or wireless communications interfaces that permit the computing device to communicate with the remote devices and systems directly or via a network. Wireless communication interfaces may include a radio frequency (RF) transceiver, a Bluetooth® adapter, a Wi-Fi transceiver, a ZigBee® transceiver, a near field communication (NFC) transceiver, an infrared (IR) transceiver, and/or any other device and communication protocol for wireless communication. (Bluetooth is a registered trademark of Bluetooth Special Interest Group of Kirkland, Washington; ZigBee is a registered trademark of the ZigBee Alliance of San Ramon, California.) Wired communication interfaces may use any suitable wired communication protocol for direct communication including, without limitation, USB, RS232, I2C, SPI, analog, and proprietary I/O protocols. Moreover, in some embodiments, the wired communication interfaces include a wired network adapter allowing the computing device to be coupled to a network, such as the Internet, a local area network (LAN), a wide area network (WAN), a mesh network, and/or any other network to communicate with remote devices and systems via the network.

Figure 3:
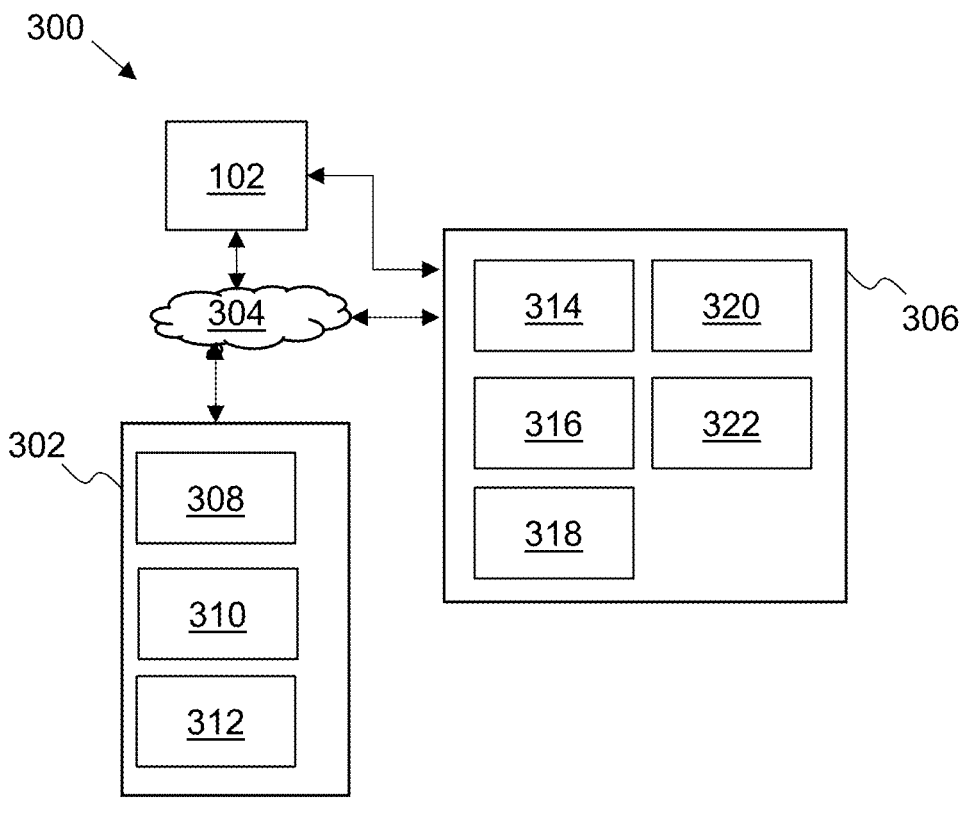
FIG. 3 is an example thermostat system including the thermostat shown in FIG. 2.

In some embodiments, the thermostat 102 may use the communication interface 212 to communicate with a mobile device (either near or remote from the thermostat) and/or a remote computing device, such as a server. An example of such a thermostat system 300 is shown in FIG. 3. The thermostat system 300 includes a server 302 in communication with the thermostat 102 and with a mobile device 306 over a network 304, such as the Internet. Other embodiments include only a server 302 or only a mobile device 306.

Server 302 includes a processor 308, a memory 310, and a communication interface 312. The server 302 may be a physical computing device, a virtual computing device, or a combination of a physical and a virtual computing device. Processor 308 may include, a general purpose central processing unit (CPU), a microcontroller, a reduced instruction set computer (RISC) processor, an application specific integrated circuit a (ASIC), programmable logic circuit (PLC), and/or any other circuit or processor capable of executing the functions described herein. The memory 310 stores data and instructions that program the processor 308 to perform as described herein. Memory 310 can include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM).

The above memory types and processor types are examples only, and are thus not limiting as to the types of memory or processor usable.

Mobile device 306 includes a processor 314, a memory 316, a communication interface 318, a user interface 320, and a display device 322. The mobile device 306 may communicate with the server 302 through the network 304, and may communicate with the thermostat 102 directly (e.g., using Bluetooth, NFC, or Wi-Fi connection to the thermostat) or through the network 304. Mobile device 306 may include any computing device configured to function as described herein, including a smartphone, a tablet, a phablet, a laptop computer, a desktop computer, a dedicated computing device associated solely with the system 300, and/or any other computing device. Processor 314 may include, a general purpose central processing unit (CPU), a microcontroller, reduced instruction set computer (RISC) processor, an application specific integrated circuit (ASIC), a programmable logic circuit (PLC), and/or any other circuit or processor capable of executing the functions described herein. The memory 316 stores data and instructions that program the processor 308 to perform as described herein. Memory 316 can include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage.

The display device 322 is configured for presenting information to a user. The display device 322 is any component capable of conveying information to the user. In some embodiments, the display device 322 includes a liquid crystal display (LCD), organic light emitting diode (OLED) display, cathode ray tube (CRT), "electronic ink" display, one or more light emitting diodes (LEDs)), or the like.

The user interface 320 is configured for receiving input from the user. The user interface is any device that permits the mobile device 306 to receive analog and/or digital commands, instructions, or other inputs from the user, including visual, audio, touch, button presses, stylus taps, etc. The user interface 320 may include, for example, keyboard/keypad, a pointing device, a mouse, a stylus, a touch sensitive panel (e.g., a touch pad or touch screen), a gyroscope, an accelerometer, a position detector, or an audio input device. A single component such as a touch screen may function as both a display device 322 and the user interface 320.

The communication interface 318 is a radio frequency (RF) transceiver, a Bluetooth® adapter, a Wi-Fi transceiver, a ZigBee® transceiver, a near field communication (NFC) transceiver, an infrared (IR) transceiver, and/or any other device and communication protocol for wireless communication. (Bluetooth is a registered trademark of Bluetooth Special Interest Group of Kirkland, Washington; ZigBee is a registered trademark of the ZigBee Alliance of San Ramon, California.) Although only one communication interface 318 is shown, the mobile device In general, the thermostat system 300 is programmed to control the HVAC system 104 to reduce usage of the HVAC system and to encourage allowing an exchange of fresh air between the outside 108 and the enclosed space 100 when the conditions are acceptable to the user. FIG. 4 is a flow diagram of an example method 400 for controlling the HVAC system 104 using the thermostat system 300.

At 400, the thermostat 102 controls the HVAC system to condition the air within the enclosed space 100 according to one or more temperature setpoints stored in a memory 210 of the thermostat 102 and the temperature within the enclosed space 100. The temperature is detected by the thermostat 102 using the temperature sensor 214. The one or more temperature setpoints may be manufacturer presets or may be selected by the user (e.g., by using the user input 206 or by programming the setpoints using an app installed on the mobile device 306 and transmitting the setpoints to the thermostat 102). Thus, at this step, the thermostat 102 operates similar to a conventional thermostat.

Weather data for outside 108 of the enclosed space is received at 404, and the weather data is compared to a previously received preference at 406. The weather data a may be received from local sensor, such as the outdoor sensor 110, or may be retrieved from a remote source, such as a weather service. The preference may be manufacturer presets or may be selected by the user (e.g., by using the user input 206 or by programming the preference using an app on the mobile device 306 and transmitting the preference to the thermostat 102).

In the example embodiment, the weather data is outdoor temperature data and the preference is one or more additional temperature setpoints. The preference identifies the conditions at which the HVAC system may be turned off to allow the opening(s) 106 to be opened to let fresh air into the enclosed space 100. The additional setpoint(s) may be a single setpoint, a range of temperatures (e.g., between 62 and 78 degrees Fahrenheit), or a schedule of setpoints that may be different at different times or days of the week. Using a single additional setpoint for explanation, if the weather data indicates that the outdoor temperature is less than the additional setpoint (when cooling) or greater than the additional setpoint (when heating), the preference is satisfied. With a range of temperatures as the additional setpoint, the preference is satisfied if the outdoor temperature is within the range of temperatures, but is not satisfied if the outdoor temperature is above or below the range of temperatures.

In some embodiments, the weather data is outdoor temperature data and outdoor humidity data (relative humidity). In some such embodiments the preference is one or more additional temperature setpoints as described above and one or more humidity setpoints. The humidity setpoints may be a single humidity setpoint, a range of humidity, or a schedule of humidity setpoints that may be different at different times or days of the week. The preference considers the additional temperature setpoint(s) and the humidity setpoint to determine if the preference has been satisfied. With a single additional setpoint and a single humidity setpoint, for example, if the weather data indicates that the outdoor temperature is less than the additional setpoint (when cooling) or greater than the additional setpoint (when heating), and below the humidity setpoint the preference is satisfied. If either of the outdoor temperature or the outdoor humidity does not satisfy the relevant setpoint, the preference is not satisfied. In some embodiments, different humidity setpoints may be associated with different additional temperature setpoints. For example, the preference could be a temperature setpoint of 78 degrees Fahrenheit if the humidity is less than 30% and a temperature setpoint of 70 degrees Fahrenheit if the humidity of less between 30% and 40%, and so on. Thus, the user may set the preferences to require the temperature to be lower before the preference is satisfied as the humidity increases.

In other embodiments in which the weather data is outdoor temperature data and outdoor humidity data, the outdoor temperature and the outdoor humidity are used to determine an effective temperature and the preference is a desired maximum effective temperature. If the effective temperature is below the maximum effective temperature of the preference, the preference is satisfied. The maximum effective temperature may be user selected or a default/present value.

In other embodiments, other weather conditions may be included (additionally or alternatively) in the weather data, and the preference may include appropriate requirements related to the other weather conditions. For example, the weather data might include whether or not it is raining outside and the preference may include that it cannot be raining if the preference is to be satisfied. Similarly, the weather data might include whether or not it is snowing, hailing, sleeting, or the like. Wind speed data (continuous and/or peak gusts) may be included in the weather data in some embodiments, and satisfaction the preference may require that the wind speed be below a wind speed setpoint. Weather data may include an outdoor allergy index, an outdoor air quality, or a dewpoint, all of which may be used with appropriate preferences (e.g., do not open the windows regardless of temperature or humidity if the outdoor allergy index is above a threshold). Other embodiments may include any other suitable weather conditions and corresponding preferences that may be combined with those discussed above.

The weather data may be current weather data, such as the temperature, humidity, or the like at the time that the weather data is received, or may be future/forecast weather data. For example, the system 300 may receive forecasted temperature data for the next day, the next week, or the like. The control based on the results of the comparison of the forecasted weather data (discussed below) will be performed based on the time/day/week that corresponds to the forecasted weather data.

In some embodiments, the preference includes one or more an indoor air quality (IAQ) criteria, which may be measured, for example, by the indoor sensor 112. The IAQ criteria may be, for example, the indoor relative humidity, an amount of particulate matter (e.g., dust) in the air in the enclosed space 100, or the like. The IAQ criteria may be used, in some embodiments, to modify one or more other aspects/criteria of the preference. For example, if the indoor humidity is high (e.g., above a setpoint), the user may be willing to open the enclosed space to the outside at a higher temperature than the normal additional setpoint temperature if the outdoor humidity is lower than the indoor humidity. Similar considerations may apply if the enclosed space is particularly dusty.

At 408, if the preference is not satisfied based on the comparison in 406, the method 400 continues to control the HVAC system according to one or more temperature setpoints stored in a memory 210 of the thermostat 102 and the temperature within the enclosed space 100.

At 408, if the preference is satisfied based on the comparison in 406, the user is notified at 410 that heating or cooling by the HVAC system 104 will be turned off and that the user should open the opening 106 to outside 108 of the enclosed space 100. The notification may be made by providing a notification in an app associated with the thermostat 102 on the mobile device 306, such as an app for configuring, monitoring, and/or controlling the thermostat 102 using the mobile device 306. In some embodiments, notification is made by the system 300 sending an email to the user or a text message (or other messaging service message) to the mobile device 306. In some embodiments, the notification is made by displaying the notification on display device 204 of the thermostat 102 or by playing an audible announcement through a speaker (not shown) of the thermostat 102. In some embodiments more than one of the above described notification types may be used. In some embodiments, the user may select which of multiple types of notifications should be used (including using multiple methods of notification). Other embodiments may use any other suitable method of notifying the user. If the weather data is forecasted weather data, the notification may be performed when the data is received, at the time/day/week corresponding to the forecasted data, or both.

After notifying the user, the thermostat 102 controls the HVAC system 104 to stop conditioning the air in the enclosed space 100 at 412. In the case of forecasted weather data, the thermostat 102 does not control the HVAC system 104 to stop conditioning the air in the enclosed space 100 until the time/day/week corresponding to the forecasted weather data. In some embodiments, the thermostat 102 causes a circulator fan to continue running to circulate air within the enclosed space (without conditioning the circulating air). In some embodiments, the thermostat 102 causes a circulator fan to continue running every time it controls the HVAC system 104 to stop condition the air in the enclosed space 100 at 412. In other embodiments, the system 300 asks the user whether or not to continue running the circulator fan (e.g., when it notifies the user at 410) and only continues to operate the circulator fan in response to the user instructing the system 300 to do so. In other embodiments, the system 300 continues operating the circulator fan in response to an IAQ condition being satisfied. For example, the IAQ condition could be the indoor humidity exceeding a threshold amount (i.e., the IAQ is poor), is some amount greater than the outdoor humidity, or the like. Any other suitable IAQ condition may be used for determining whether or not to continue operating the circulator fan. In still other embodiments, the user is able to select from two or more of the above ways of determining whether or not to continue operating the circulator fan and configure the system 300 to operate according to the user's selection.

When the preference is no longer satisfied (e.g., the outdoor temperature rises above the additional temperature setpoint in the preference), the thermostat 102 again controls 402 the HVAC system to condition the air within the enclosed space 100 according to the one or more temperature setpoints and the temperature within the enclosed space 100.

Some parts of the method 400 described above may be performed by the thermostat 102, by the server 302, or by the mobile device 306. Controlling the HVAC system at 404 and 412 is performed by the thermostat 102 in all embodiments.

In some embodiments, the thermostat 102 performs all of the method 400 (in addition to controlling the HVAC system at 401 and 412). In such embodiments, the thermostat receives 404 the weather data, compares 406 the weather data to the preference, and notifies 410 the user when appropriate.

In other embodiments, the server 302 or the mobile device 306 performs receives 404 the weather data, compares 406 the weather data to the preference, and notifies 410 the user when appropriate. In such embodiments, the server 302 or the mobile device 306 also instructs the thermostat when to control 412 the HVAC system 104 to stop conditioning the air within the enclosed space 100. These embodiments may allow the method 400 to be used with a thermostat 102 that does not have sufficient processing power to perform all of the method 400 or that simply does not have the programming to perform the method 400, so long as the thermostat 102 can receive instructions from the server 302 or mobile device 306 to instruct the thermostat 102 when to stop controlling the HVAC (and when to start controlling it again).

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of conditioning air within an enclosed space, the enclosed space occupiable by a user and having at least one opening to outside of the enclosed space that may be selectively opened or closed, and a thermostat monitoring a temperature of the air within the enclosed space and controlling a heating ventilation and air condition (HVAC) system in fluid communication with the enclosed space, the method comprising:

controlling, by the thermostat, the HVAC system to condition the air within the enclosed space according to one or more temperature setpoints stored in a memory of the thermostat and the temperature within the enclosed space;

receiving weather data for outside the enclosed space;

comparing the weather data to a previously received preference different than the one or more temperature setpoints;

continuing to control the HVAC system to condition the air within the enclosed space according to the one or more temperature setpoints and the temperature within the enclosed space when the weather data does not satisfy the preference; and when the weather data satisfies the preference:

notifying the user that heating or cooling by the HVAC system will be turned off and that the user should open the at least one opening to outside of the enclosed space;

controlling, by the thermostat, the HVAC system to stop conditioning the air within the enclosed space after notifying the user and in response to the weather data satisfying the preference; and controlling the HVAC system to resume conditioning the air within the enclosed space according to the one or more temperature setpoints and the temperature within the enclosed space in response to the preference no longer being satisfied after controlling the HVAC system to stop conditioning the air within the enclosed space.

2. The method of claim 1, wherein the receiving of the weather data for outside the enclosed space, the comparing of the weather data to the previously received preference, and the notifying the user that heating or cooling by the HVAC system will be turned off and that the user should open the at least one opening to outside of the enclosed space are all performed by the thermostat.

3. The method of claim 1, wherein the receiving of the weather data for outside the enclosed space, the comparing of the weather data to the previously received preference, and the notifying the user that heating or cooling by the HVAC system will be turned off and that the user should open the at least one opening to outside of the enclosed space are all performed by a remote device communicatively coupled to the thermostat.

4. The method of claim 3, further comprising transmitting, by the remote device, instructions to the thermostat that instruct the thermostat to control the HVAC system to stop conditioning the air within the enclosed space when the weather data satisfies the preference.

5. The method of claim 1, wherein the weather data comprises a temperature outside of the enclosed space, and the preference comprises at least one additional temperature setpoint or a range of temperatures.

6. The method of claim 5, wherein temperature outside of the enclosed space is received from a temperature sensor outside of the enclosed space.

7. The method of claim 5, wherein the temperature outside of the enclosed space is received from a weather service.

8. The method of claim 1, wherein the weather data comprises a temperature and a humidity outside of the enclosed space, and the preference comprises at least one additional temperature setpoint or a range of temperatures and at least one humidity setpoint or range of humidity.

9. The method of claim 1, wherein the notifying the user that heating or cooling by the HVAC system will be turned off and that the user should open the at least one opening to outside of the enclosed space comprises notifying the user with a notification in an application installed in a mobile device of the user.

10. The method of claim 1, wherein the notifying the user that heating or cooling by the HVAC system will be turned off and that the user should open the at least one opening to outside of the enclosed space comprises notifying the user by sending an email or a text message to the user.

11. The method of claim 1, wherein the notifying the user that heating or cooling by the HVAC system will be turned off and that the user should open the at least one opening to outside of the enclosed space comprises notifying the user with a notification on a display of the thermostat.

12. The method of claim 1, wherein the controlling of the HVAC system to stop conditioning the air within the enclosed space comprises continuing to run a circulator fan of the HVAC system.

13. The method of claim 12, wherein the continuing to run a circulator fan of the HVAC system comprises continuing to run a circulator fan of the HVAC system in response to user selection of whether or not to run circulator fan.

14. The method of claim 12, wherein the continuing to run a circulator fan of the HVAC system comprises continuing to run a circulator fan of the HVAC system in response to a received measurement of indoor air quality in the enclosed space.

15. A thermostat for controlling a heating ventilation and air condition (HVAC) system for conditioning air within an enclosed space, the enclosed space occupiable by a user and having at least one opening to outside of the enclosed space that may be selectively opened or closed, the thermostat comprising:

a temperature sensor;
a communication interface;
processor; and
a memory, the memory storing one or more temperature setpoints, a preference different than the one or more temperature setpoints, and instructions that program the processor to:
control the HVAC system to condition the air within the enclosed space according to the one or more temperature setpoints and a temperature within the enclosed space measured by the temperature sensor;
receive weather data for outside the enclosed space;
compare the weather data to the preference;
continue to control the HVAC system to condition the air within the enclosed space according to the one or more temperature setpoints and the temperature within the enclosed space when the weather data does not satisfy the preference; and
when the weather data satisfies the preference:
notify the user that heating or cooling by the HVAC system will be turned off and that the user should open the at least one opening to outside of the enclosed space; and
control the HVAC system to stop conditioning the air within the enclosed space after notifying the user and in response to the weather data satisfying the preference; and

control the HVAC system to resume conditioning the air within the enclosed space according to the one or more temperature setpoints and the temperature within the enclosed space in response to the preference no longer being satisfied after controlling the HVAC system to stop conditioning the air within the enclosed space.

16. The thermostat of claim 15, wherein the weather data comprises a temperature outside of the enclosed space, and the preference comprises at least one additional temperature setpoint or a range of temperatures.

17. The thermostat of claim 16, wherein the temperature outside of the enclosed space is received from a temperature sensor outside of the enclosed space.

18. The thermostat of claim 15, wherein the weather data comprises a temperature and a humidity outside of the enclosed space, and the preference comprises at least one additional temperature setpoint or a range of temperatures and at least one humidity setpoint or range of humidity.

19. The thermostat of claim 15, wherein the processor is programmed to notify the user that heating or cooling by the HVAC system will be turned off and that the user should open the at least one opening to outside of the enclosed space by one or more of generating a notification in an application installed in a mobile device of the user, sending an email or a text message to the user, or generating a notification on a display of the thermostat.

20. The thermostat of claim 15, wherein the processor is programmed to continue to run a circulator fan of the HVAC system after controlling the HVAC system to stop conditioning the air within the enclosed space in response to user selection of whether or not to run circulator fan or a received measurement of indoor air quality in the enclosed space.

* * * * *